(12) United States Patent
Motsenbocker

(10) Patent No.: US 9,455,572 B2
(45) Date of Patent: Sep. 27, 2016

(54) VOLTAGE PRIORITIZATION OF SOLAR LOADS

(71) Applicant: Marvin A Motsenbocker, Fredericksburg, VA (US)

(72) Inventor: Marvin A Motsenbocker, Fredericksburg, VA (US)

( * ) Notice: Subject to any disclaimer, the term of this patent is extended or adjusted under 35 U.S.C. 154(b) by 538 days.

(21) Appl. No.: 13/869,945

(22) Filed: Apr. 24, 2013

(65) Prior Publication Data

US 2013/0327077 A1 Dec. 12, 2013

Related U.S. Application Data

(60) Provisional application No. 61/639,144, filed on Apr. 27, 2012.

(51) Int. Cl.
*H02J 1/00* (2006.01)
*F25B 27/00* (2006.01)
*H02J 7/35* (2006.01)

(52) U.S. Cl.
CPC ............... *H02J 1/00* (2013.01); *F25B 27/005* (2013.01); *H02J 7/35* (2013.01); *Y10T 307/352* (2015.04)

(58) Field of Classification Search
CPC ............... H02J 7/35; H02J 1/00; H02J 3/02; H02J 3/383; Y10T 307/352; F25B 27/005
USPC ................................................. 307/1–144
See application file for complete search history.

(56) References Cited

U.S. PATENT DOCUMENTS

| | | | |
|---|---|---|---|
| 7,126,294 B2 * | 10/2006 | Minami et al. ............ 318/139 | |
| 8,373,303 B1 * | 2/2013 | Daniels ................. H02J 7/35 | 307/23 |
| 8,915,778 B2 * | 12/2014 | Boehling ................. F24F 7/025 | 136/244 |
| 8,975,779 B2 * | 3/2015 | Cooper ....................... H02J 3/14 | 307/20 |
| 9,240,687 B2 * | 1/2016 | Carralero ............... H02J 3/383 | |
| 2004/0232878 A1 * | 11/2004 | Couch et al. .............. 320/101 | |
| 2006/0132102 A1 * | 6/2006 | Harvey ....................... G05F 1/67 | 32/166 |
| 2006/0276938 A1 * | 12/2006 | Miller ...................... G06Q 50/06 | 700/295 |
| 2009/0027932 A1 * | 1/2009 | Haines ....................... H02J 9/062 | 363/95 |
| 2009/0152947 A1 * | 6/2009 | Wang ........................ H02J 1/14 | 307/24 |
| 2011/0148195 A1 * | 6/2011 | Lee ........................... H02J 7/35 | 307/25 |
| 2012/0239595 A1 * | 9/2012 | Kiuchi et al. ................ 705/412 | |
| 2012/0293000 A1 * | 11/2012 | Fan ......................... H02J 1/102 | 307/64 |
| 2013/0035802 A1 * | 2/2013 | Khaitan ................... G06F 1/263 | 700/297 |
| 2014/0049053 A1 * | 2/2014 | Inoue ........................ 290/30 R | |
| 2014/0084682 A1 * | 3/2014 | Covic ........................ H02J 3/14 | 307/17 |

OTHER PUBLICATIONS

U.S. Appl. No. 61/525,483, Daniels and Saussele.

* cited by examiner

*Primary Examiner* — Jared Fureman
*Assistant Examiner* — Michael Warmflash

(57) ABSTRACT

Solar electric energy is optimally used by varying one or more connected loads to achieve a maximum output power voltage. Entire appliances may be switched on or off, or modulated, as in the case for example of a heat pump compressor circuit or electric water heater. Variations of this theme are used to prioritize appliance usage for overall improved convenience and efficiency. Solar electric appliances such as refrigerators, freezers, air dryers and water pumps are described. This and other electric sources may be used to power electric garden tools. Electric distribution tools and methods are described as well as electric garden tillers with features such as semi-control and smooth operation.

17 Claims, 12 Drawing Sheets

Figure 8
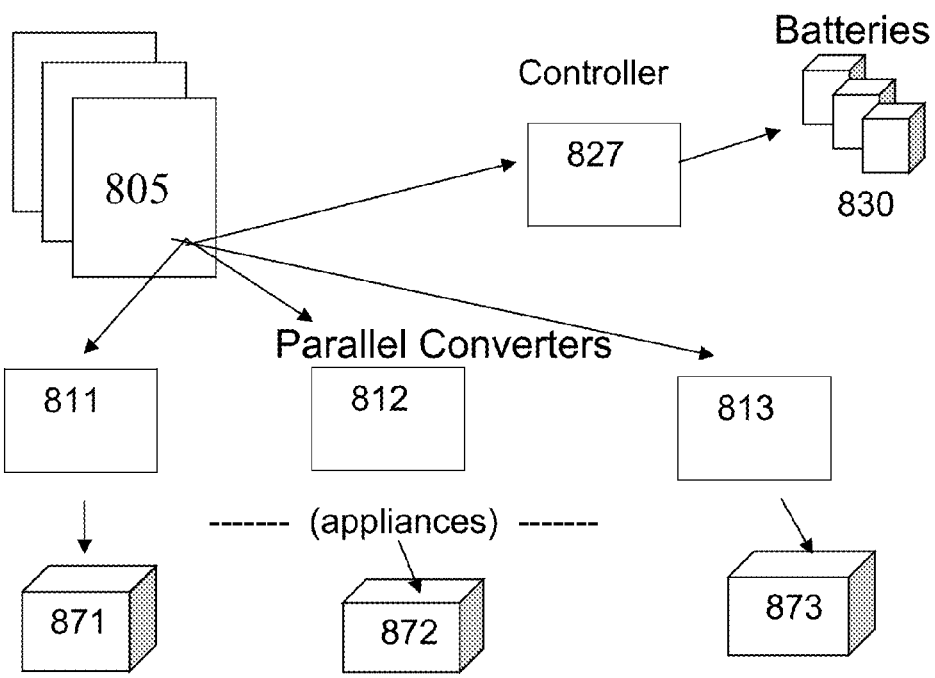
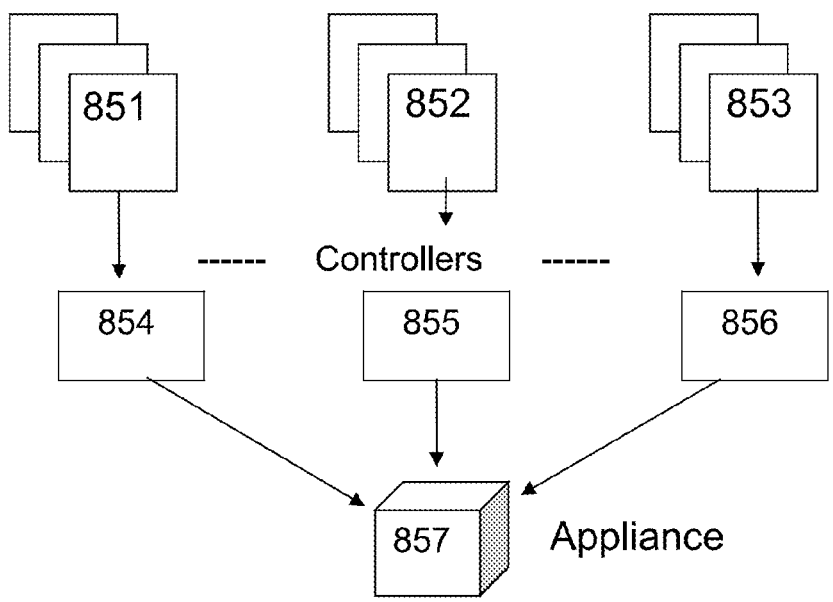

VOLTAGE PRIORITIZATION OF SOLAR LOADS

CROSS REFERENCE TO CO-PENDING APPLICATIONS

This application enjoys priority from U.S. No. 61/639,144 filed Apr. 27, 2012 by inventor Marvin Motsenbocker, with the same title, of which the entire contents are incorporated by reference herein.

FIELD

The contents of this disclosure relate to electric energy management and more specifically to controlled use of solar electricity by appliances.

BACKGROUND

Solar electric energy has become more practical because solar panel prices have dropped, in some cases to below one dollar per watt. However, end users generally have been unable to fully take advantage of lower solar cell costs because the expense of controlling and manipulating electric power from solar panels dominates the total cost. In particular, control and manipulation circuits can include battery charging/discharging to supply all appliances off grid, conversion of one less desirable solar output voltage to a different voltage such as used in PMMT controllers, conversion of DC solar electricity to AC used by appliances and the like.

Such transformations of solar electric power incur losses every step of the way. Consequently, small scale solar electric site installations generally forgo altogether the use of solar electricity for hot water heating, heat pump activation, clothes dryer, and other high energy use appliances. The solar electric energy field often is associated with a lower energy, minimalist or poor life style suited for depression living, provided to us by the collapse of our fractional reserve banking system.

Another common problem with the big utility, big investment approach to the design and use of local solar electric installations is the high cost of batteries. While not readily appreciated, when included into such systems the batteries are a chemical Achilles heel that wear out and quickly become a most expensive limitation. Consider for example, a $2,000 10 kw hour capacity battery pack system that typically can be charged and discharged 500 to 1000 times. The materials cost of using this chemistry for energy storage in this instance is about 20-40 cents per kilowatt hour, which is at least 2-4 times the cost of grid power in most areas of the US.

Accordingly many discussions of solar electricity begin with the conclusion that the user should abandon a high energy life style to a more "energy efficient" (i.e. give up one or more modern appliances) lifestyle. For example, the notion of using solar electric for hot water heating or for drying clothes is often dismissed as wasteful because passive solar systems must be used since passive solar is so much cheaper and energy efficient. Unfortunately, installations in locations such as northern US or Hokkaido in Japan experience freezing several months a year and seem poor candidates for low cost high efficiency passive roof top water heating.

Finally, as this industry develops, companies develop ever increasingly complicated and expensive hardware to optimize solar panel energy. For example, individual solar panel converters have been developed to improve conversion of solar panel generated electricity but often cost as much or a significant fraction of the panels themselves. A basic challenge is the change in electric solar output characteristics with temperature and irradiation. As light irradiation of the solar panel decreases the available current decreases below an optimum voltage. Also, as temperature increases this optimum panel output voltage decreases. In order to harvest the maximum potential energy, interfacing circuits such as "controllers" have to take into account some or all of these variables. For example, expensive MPPT converters are now chosen for high end systems and can provide more optimum power output (compared to PWM based converters), despite the fact that many of these PMMT converters charge batteries (increase battery deterioration rate) poorly compared to the PWM converters that they replace.

A major challenge has been to optimize solar power output from solar panels despite differing solar irradiation, and more importantly, despite different optimum voltage output at different operating temperatures. FIG. 1 shows, for example that optimum voltage output drops with increasing temperature. MPPT controllers in particular address this problem. However, addition of such complicated circuitry as buck boost converters etc. between the solar panels and a load introduce their own inefficiencies.

For example, a data sheet for a representative converter, the Solar Boost 50 PMMT indicates that although this converter is an excellent system compared to other systems i.e. viewpoint of efficiency, even this high efficiency system wastes on average 3% of solar power under average high lighting conditions and wastes 7% under ⅕ maximum lighting (and presumably more than 10% at lower lighting conditions). These circuit losses are in addition to extra losses incurred by battery charging/discharging, conversion of low voltage DC to higher voltage AC useful for appliances and the like.

A major problem generally is that every circuit conversion or manipulation of solar power wastes some of the available power. As increasingly complicated and multiple added circuits are interposed between the solar panel output and the appliance, this overhead can be very expensive and counterproductive. For example, a modern system design using an MPPT controller might include circuits that convert a solar panel output to a desirable loading voltage (wasting perhaps 1%, 5% or 10% energy within the circuit as mentioned above), which then might charge a battery (wasting perhaps 10% via storage) and then convert the DC into AC (wasting 10% or more). Convertors and invertors sold for solar electric systems generally cite maximum efficiency of the circuits but generally have much lower efficiency for many operating conditions. In many instances a cited "high efficiency" conversion such as a conversion from solar panel to a charger or converter is 95% or more but in actuality often is less than 90% or even much less, depending on actual operating conditions.

In sum, big company developers provide ever more complicated conversion and manipulation systems for enhancing "efficiency." But these ever complex designs generally are expensive, dominate system cost and add their own inefficiencies under operating conditions that often are overlooked. This field needs less complicated equipment and more efficient matching of solar panel output to appliances.

BRIEF DESCRIPTION OF THE DRAWINGS

FIG. 8 shows parallel connection of a solar electric power supply with multiple controllers for multiple users, or appliances.

DETAILED DESCRIPTION OF PREFERRED EMBODIMENTS

Figure 1:
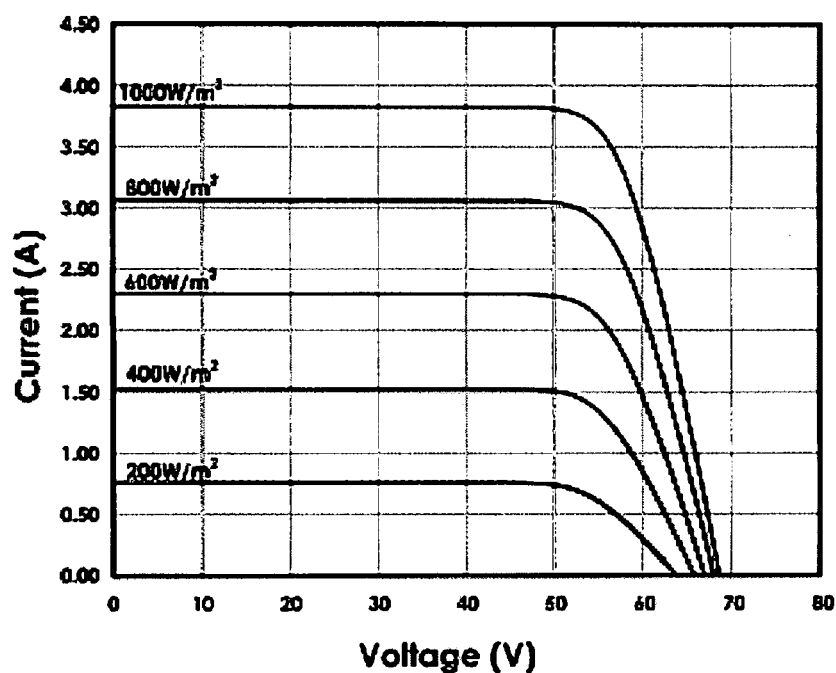
FIG. 1 shows representative voltage/current output relationships for solar panels at different operating temperatures.

An embodiment provides a solar electric converter system comprising: one or more solar panels, PWM energy storage unit charger and a variable appliance loader for providing regulating power to an appliance, wherein the variable appliance loader is configured to load the one or more solar panels to maintain an optimized maximum power output voltage. Another embodiment provides the system above wherein the optimized output voltage is adjusted for solar panel temperature. In another embodiment of this system, the variable appliance loader uses pulse width modulation and increases pulse width with increased detected voltage above the optimized output voltage. In yet another embodiment, a maximum of one blocking diode and one other power semiconductor device is necessarily electrically connected in series between the solar panel output and the appliance to achieve regulated power.

In a desirable embodiment of the above system, the power provided to the appliance is direct current. The regulated power can be provided to at least one of: a heating element, a DC motor, a high power ultraviolet light used for disinfection, an infrared light used for heating or drying, a grow light, and an electrochemical reaction. Also, in such embodiment, the electrochemical reaction can be the splitting of water.

Another embodiment provides a solar energy powered freezer system comprising one or more solar panels, and a freezer, wherein the freezer comprises a first lower set-point thermostat configured to control use of solar electricity from the one or more solar panels to activate a compressor or piezoelectric device during the day and a second set-point thermostat configured to control use of electricity from another source during the night to activate the same or other compressor or piezoelectric device for cooling. In an embodiment, the solar energy powered freezer system may have a maximum of one blocking diode and one other power semiconductor device is necessarily electrically connected in series between the solar panel output and the compressor or piezoelectric device to achieve regulated power. In an embodiment of this solar energy powered freezer, the first lower set-point thermostat and the second set-point thermostat may comprise a single temperature sensor in a circuit that effectively activates a freezer compressor or peltier device at lower control temperature at noon than at midnight.

Another embodiment provides a solar electric system with optimized loading of one or more solar panels having an optimum output voltage, comprising the solar energy powered freezer as described above and a PWM controller, wherein the PWM controller is configured to maintain loading on the one or more solar panels to maintain an optimum solar panel voltage. In an embodiment, the solar electric system further comprises a PWM controller for charging an energy storage unit from energy of the one or more solar panels.

The solar energy powered freezer first thermostat setpoint desirably may be at a first temperature less than 10 degrees C. below freezing, and the second thermostat setpoint may be at least 10 degrees C. below freezing and wherein the second thermostat is active during solar irradiation and the first thermostat is active at night.

An embodiment provides a solar powered electric water heater comprising one or more solar panels, a water heater heating element, a first PWM controller for charging an energy storage unit, and a second controller for activating the water heater heating element, wherein the second controller for activating the water heater heating element is configured to increase loading on the one or more solar panels at output voltages above an optimum voltage for power output.

In an embodiment of this solar powered electric water heater, a maximum of one blocking diode and one other power semiconductor device is necessarily electrically connected in series between the solar panel output and a heating element of the water heater to achieve optimum power output.

Another embodiment provides a solar powered water pump comprising one or more solar panels, a water pump for pressurizing a water line, and a water pressure tank connected to the water line, wherein the water pump is controlled by one or more pressure switches that activate at low, medium and high pressure conditions, wherein solar energy from the one or more solar panels is used to activate the water pump until the high pressure cutoff is reached, and non-solar energy is used to drive the pump upon pressure dropping below the low pressure condition until the medium pressure condition is reached. In an embodiment of this solar powered water pump, the water pressure tank is selected from the group consisting of a bladder tank and a water tank at higher elevation.

The solar powered water pump may have the low pressure condition of between 15 psi+/−3 psi and a high pressure condition between 45 psi+/−5 psi. In an embodiment of the solar powered water pump, a maximum of one blocking diode and one other power semiconductor device is necessarily electrically connected in series between the solar panel output and the water pump to achieve the control. In an embodiment, wherein the water pump comprises a DC motor.

Yet another embodiment is a solar powered heat pump system having a variable speed compressor, comprising one or more solar panels, a heat pump compressor having a low power setting and at least one higher setting, wherein the compressor is configured to operate at the higher setting when full sun is detected and to shift operation to the lower setting when solar energy output drops. In an embodiment, the compressor turns off after shifting to the lower setting in response to a further drop in solar energy. An embodiment further comprises an energy storage unit and a first PWM controller for charging the energy storage unit as needed as a higher priority, and the wherein the heat pump compressor is activated to optimally load the one or more solar panels to a maximum output condition when enough solar energy is available to drive the heat pump compressor.

Yet another embodiment provides a solar powered heat pump, comprising one or more solar panels, a heat pump comprising an air handling fan and a variable speed compressor, wherein the variable speed compressor is configured to be driven at different levels from solar panel energy output at commensurately different levels and the air handling fan is configured to be driven by a reliable energy source that does not change directly with solar panel energy output levels.

In an embodiment of this solar powered heat pump, a maximum of one blocking diode and one other power semiconductor device is necessarily electrically connected in series between the solar panel output and the heat pump compressor.

Yet another embodiment provides a solar powered dryer comprising one or more solar panels, a motor for moving a wet material and a heat element wherein at least the motor or heat element is configured to receive less power when solar output decreases and to receive more power when solar power increases again. In an embodiment, the dryer is a clothes dryer and the heat element receives less solar power when solar output decreases, whereas the motor is configured to receive power from a reliable power supply and does not automatically receive less power when solar output decreases. In an embodiment, the motor receives less power after solar output decreases for a minimum set time period. In an embodiment, wherein the motor is a DC motor and a maximum of one blocking diode and one other power semiconductor device is necessarily electrically connected in series between the solar panel output and the motor to carry out control.

Another embodiment provides a solar powered hot water generator comprising one or more solar panels, a larger insulated water tank that receives energy at least mostly from solar energy when solar energy is generated and a smaller hot water generator that receives primarily non-solar energy upon hot water demand, wherein the larger insulated water tank supplies water to the smaller hot water generator. In an embodiment, the smaller hot water generator is selected from the group consisting of an insulated, small hot water pot and a heated water line. In an embodiment, the variable appliance loader is configured to apply solar electricity to two or more loads that are prioritized. In an embodiment the two or more loads are selected from the group consisting of a refrigeration compressor, a heat pump compressor, a water pump, a fan, lights, a dryer heater, a dryer motor, a water tank heater, an infrared heater, a floor heater, and a resistance air heater.

An embodiment provides a solar electric prioritizing converter system for optimizing load on a solar electric output, comprising: a battery charger electrically connected to the solar electric output that charges a battery as needed; a converter that electrically connects the solar electric output to at least a higher priority category of appliances and a lower priority category of appliances, wherein the higher priority of appliances preferentially are presented as a load on the solar electric output to maintain an optimum output voltage.

In an embodiment of the solar electric prioritizing system, the higher priority category of appliances comprises one or more of a water pump, a refrigeration compressor, a gardening appliance, and a heat pump compressor. In an embodiment, the lower priority category of appliances comprises at least one resistance heater. In an embodiment of the solar electric prioritizing system, the battery charger comprises a phase width modulation circuit and the converter comprises a phase width modulation circuit for differentially loading the solar electric output by variably activating one or more appliances. In another embodiment, a maximum of one blocking diode and one other power semiconductor device is necessarily electrically connected in series between the solar electric output and the appliance to maintain optimum output voltage.

Combinations of these embodiments and further embodiments based on the figures are contemplated but not listed for brevity.

Figure 2:
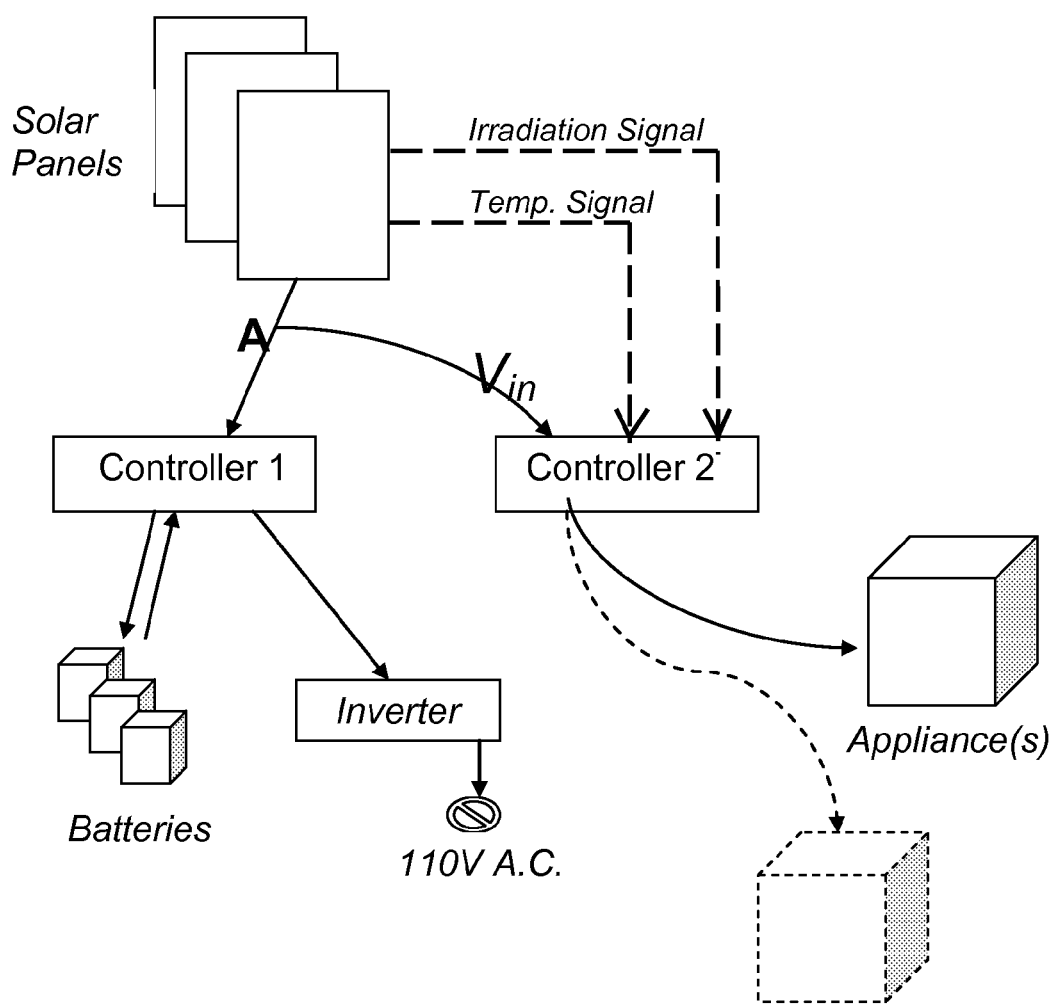
FIG. 2 shows a desirable system embodiment.

Combine PMT Battery Charger Controller Circuit with $2^{nd}$ Appliance Controller Circuit that Optimizes Solar Output A desirable embodiment is a scheme that comprises two controller portions (such as circuits or sub-circuits) for two separate purposes. See FIG. 2. A first PWM controller portion is optimized to charge a battery bank and draws current as it needs from the solar electric panels for best battery charging. Optionally the controller monitors solar panel voltage and does not load solar output more than optimum. Preferably the size (current output to battery) capacity for a 10 hour charging regime is small compared to the solar panel array size. A battery bank capacity is sized small with respect to a solar installation so that overload of the solar output (i.e. loading on the solar panel array that depresses the solar array voltage output to below the maximum output) is rare.

Preferably a maximum charging current by this controller is no more than ¼ the maximum output in amps of the solar array. Accordingly, the controller/charger will not overload the solar output as long as the sun irradiation is at least ¼ maximum. In another embodiment the maximum solar output size (in amps at the maximum power output point) is at least 10 times the maximum charging current output of the controller to the batteries. This first controller also usually has an output for a load, such as an inverter load. Usually the load and battery charging have the same or nearly the same current limit.

The PWM battery charging controller portion is combined with a second controller portion for supplying solar electric current to an appliance. The second controller monitors the output voltage of the solar panel or solar array (Vin in FIG. 2) and adjusts loading to the appliance as needed to maintain maximum output conditions. Preferably the second controller has a reference voltage corresponding to the desired maximum output voltage and compares the desirable reference voltage with the measured voltage. If the measured voltage is higher than the reference then the controller increases load from the appliance(s) to get the solar source voltage down. If the measured voltage is lower than the desired voltage, then the appliance load is lightened. In an embodiment the set reference voltage is further modified or compensated by measured temperature of the solar panel for improved efficiency of loading. In a less preferred embodiment a solar irradiation level signal (e.g. from a light sensor or solar electric output device) is used to adjust the reference.

Figure 4:
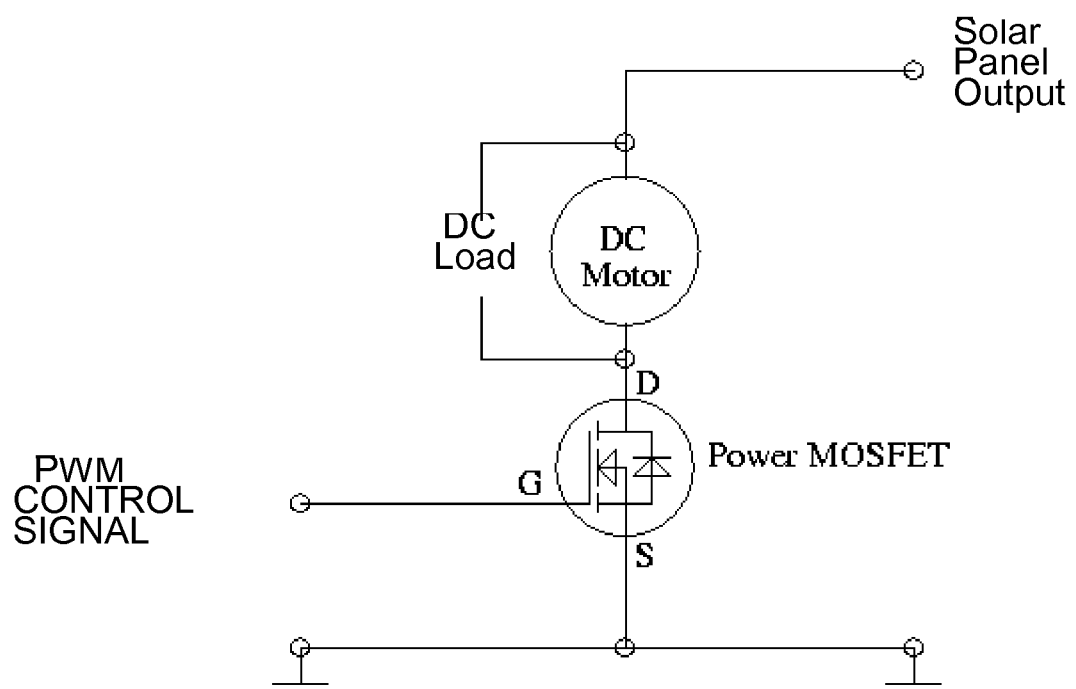
FIG. 4 shows details for a desirable minimum circuit embodiment that minimizes energy loss.

For DC loads, a PWM controller is preferred due to simplicity and cost. AC loads similarly can be modified to achieve maximum power output of the solar electricity source, using for example, TRIAC(s), SCR(s), IGBT(s), or MOSFETS wired in quadrature to control power applied as alternating current to the load. Most preferably however the load is a DC load and a single MOSFET (or MOSFETs wired in parallel) is used for control with minimal energy waste from placing the active device in series with the load. The two or more controllers preferably are coupled parallel and isolated from each other by the use of blocking diodes. For example one or both controller lines connected at "A" in FIG. 2 may have a diode in series. In a preferred embodiment the controller circuitry between this blocking diode and the controlled load is a single MOSFET (or paralleled MOSFETS) as shown in FIG. 4.

Modified Appliances to Optimize Solar Electric Usage

In desirable embodiments, an appliance is modified to optimize (maximize) use of real time delivered solar electric energy. Desirably, the appliance is energized by real time, un-stored electric solar energy. In an embodiment the appliance is used one way during solar irradiation conditions (e.g. at noon) and a second way during dark, or night time conditions (e.g. at night). In many embodiments the appliance is not used in dark conditions but is used more energetically than normal during high light conditions. The term "high light" in an embodiment means enough solar irradiation such that the solar electric output can energize the appliance enough for at least some useful partial operation.

In an embodiment "night" and "day" use referred to below is determined by time but in another more desirable embodiment "night" refers to when solar electric output is too low to be used by the referred to device and "day" refers to any time when ample solar electric output is available. Switching or deciding between "day" and "night" could be performed by a clock but also could be performed by monitoring the solar electric output itself or by using a separate monitor of solar irradiation. Many commercial devices are tested or rated from 20% maximum sunlight to 100% full sunlight conditions as customarily used by skill artisans where full sunlight is * lux. In a preferred embodiment 10% or more or even 5% or more of the maximum is "daylight" for purposes of selecting sunlight (vs dark) operation of appliances as described herein.

Freezer/Refrigerator:

Two or more control temperature thresholds are used at different time periods for a freezer/refrigeration unit connected directly via a simple controller to the electric solar unit. In an embodiment a single thermistor or other sensor is connected to activate cooling of the freezer or refrigeration at a first lower temperature during the day (when solar irradiation is available for example) and to a second higher temperature during the night. This operates to use solar energy directly for more stringent conditions (operates during lower temperatures) during the day than during the night. In practice, the freezer or refrigerator temperature is controlled to become colder during the day than at night.

Refrigerator with Homeostatic Cooling:

In this embodiment a refrigerator has two compartments, a cooling mass compartment and a refrigerator space compartment that holds materials such as food, to be cooled. The cooling mass compartment is thermally isolated from the refrigerator space by insulation except that a mechanism is included for breaching the thermal isolation as needed. The breaching mechanism is controlled to provide cooling from the cooling mass compartment when a. real time solar electric power is not available (sun is not shining to generate enough solar electric energy) and b. the refrigerator space warms up beyond a set point (e.g. thermostat control setting).

The cooling mass is cooled only by real time solar power when the sun is shining. The cooled mass then passively cools the refrigerator space as needed (preferably by thermostat control) by breeching the insulation barrier between cooling mass and refrigerator space. In an embodiment an electric compressor pump removes heat from the cooling mass (e.g. a freezer, material at very low temperature) location, which is insulated from the refrigerator compartment via insulation such as Styrofoam or polyurethane foam. A metal wall of the refrigerator has a portion that penetrates the insulation at a small area (hole) and that comes into physical contact with metal of the freezer portion by action of a motor or solenoid, as needed to transfer heat from the refrigerator portion to the freezer portion. In another embodiment, a fluid is pumped between the two portions to effect the transfer. In yet another embodiment a normally occluded opening is opened up to allow air transfer between the portions (preferably with a fan). A skilled artisan can construct other ways to controllably transfer heat via mechanical or fluid (or air) transfer contact.

Water Pressure Pump:

When used for a water pressure pump, two or more pressure thresholds are used such that during sunshine the water pump is controlled to produce higher pressures (higher pressure OFF switch limit) and during nighttime (i.e. when solar irradiation is not sufficient for pumping) the water pressure is allowed to drift lower before activating turn on of the pump (and preferably once activated the pump turns off again at a lower pressure than during the day). In an embodiment the lower pressure (turn on pressure limit switch) is the same for both conditions, but the turn off upper pressure limit is higher during the day than during the night. In another embodiment the same upper turn off pressure limit is used but the turn on lower pressure limit is used during the night and a higher pressure turn on limit is used during the day. That is, the pump is activated to increase water pressure at a higher low-pressure limit when solar irradiation is available. The effect of this is to preferentially use solar electricity in real time when solar irradiation is available.

Heat Pump:

An embodiment uses solar electricity directly (i.e. without battery storage) to power a heat pump having a compressor electric motor with an adjustable power/speed. Preferably the heat pump uses a DC motor and the motor is controlled over at least a 2.5 power ratio, more preferably at least a 3 fold power ratio and even more preferably over at least a 5 fold power ratio. The electronics (e.g. Circuit board based microprocessor etc.) receive constant power preferably, and an air handling fan preferably is powered separately from the compressor motor. In an embodiment the electronics and air handling fan (fan that moves air over a heat exchanger) receive at least backup power from a battery so that when sunlight decreases power continuously is supplied to the fan (which preferably switches to a lower speed upon loss or decrease in solar electric power) and to the circuitry. The compressor pump motor is controlled to a lower speed suitable for powering from a lower solar electric output when sunlight drops and to increase to a higher speed when solar electric power increases. This control can be activated or modulated by a current sensor in the solar electric output (total current from the solar electric supply used for the feedback signal) or less preferably by a photosensor having an output which is used to control the compressor motor. Thus a preferred embodiment has a compressor motor powered solely by solar electric power produced instantaneously and has a circuit and fan that are powered by both solar electric power output and by a battery, (or by mains power) which supplies power when solar power is insufficient.

Clothes Dryer:

An embodiment uses solar electricity directly (i.e. without battery storage) to power a drum motor with an adjustable power/speed to turn the clothes. Preferably the rotating drum uses a DC motor and the motor is controlled over at least a 2.5 power ratio, more preferably at least a 3 fold power ratio and even more preferably over at least a 5 fold power ratio. The electronics (e.g. Circuit board (if used) based microprocessor etc.) receives constant power preferably, and an air blower preferably is powered separately from the drum motor. In an embodiment the electronics and air blower (fan that moves air over an optional heating element (electric or other source of heat)) receive at least backup power from a battery so that when sunlight decreases power continuously is supplied to the fan (which preferably switches to a lower speed upon loss or decrease in solar electric power) and to the circuitry. The drum motor is controlled to a lower speed suitable for powering from a lower solar electric output when sunlight drops and to increase to a higher speed when solar electric power increases.

This control can be activated or modulated by a current sensor in the solar electric output (total current from the solar electric supply used for the feedback signal) or less preferably by a photosensor having an output that is used to control the drum motor. Thus a preferred embodiment has a drum motor powered solely by solar electric power produced instantaneously and has a circuit and fan that are powered by both solar electric power output and by a battery, (or by mains power) which supplies power when solar power is insufficient. Preferably the dryer includes an electrical resistance heating element that provides heat when solar power is available and which does not use battery power.

Solar Electric Clothes Dryer.

In a desirable embodiment an electric dryer has 3 circuit portions. A first control portion has user operated switch(es) and relays or other power control devices and preferably a timer. A second motor portion comprises a motor that moves clothes, such as by rotating a drum. A third portion comprises an electric heating element. The first and second portions preferably are powered by constant power, and more preferably with a battery backup or other supply (such as mains). The third portion is powered by direct solar electric (without significant electricity storage or even without any storage). In this case the third portion has variable power applied, allowing maximum use of available solar power. Preferably the first portion includes a moisture sensor to determine drying time, since the time of drying is influenced by sunlight availability.

In a working example a Haier Model * dryer was modified wherein the first two circuit portions were driven by a DC to AC converter (with battery backup) for a maximum constant power of about 100 watts. The third circuit portion was modified by connecting the power output for a 120 volt heating element to activate a relay, wherein the relay switches real time available solar electric power to the electric heater.

The high voltage heating element was activated using DC voltage powered by solar electric panels. To convert low voltage DC from the solar panels to higher voltage needed by the heating element, a PWM controlled MOSFET switched based boost circuit was used. An advantage of this circuit for electrical resistance heating is that changes in power output from the solar electric panels do not harm the appliance. Under low sun conditions, the resistance element receives less power than under high sun conditions and the voltage applied to the resistance heater can be altered without harming the appliance, even though a buck circuit is used. Preferably a simple, low loss and low cost buck converter is used that is unregulated with unregulated output or the output is regulated to have a maximum DC voltage, which preferably is 0.707 times the rated AC voltage for the power consuming device.

Figure 5:
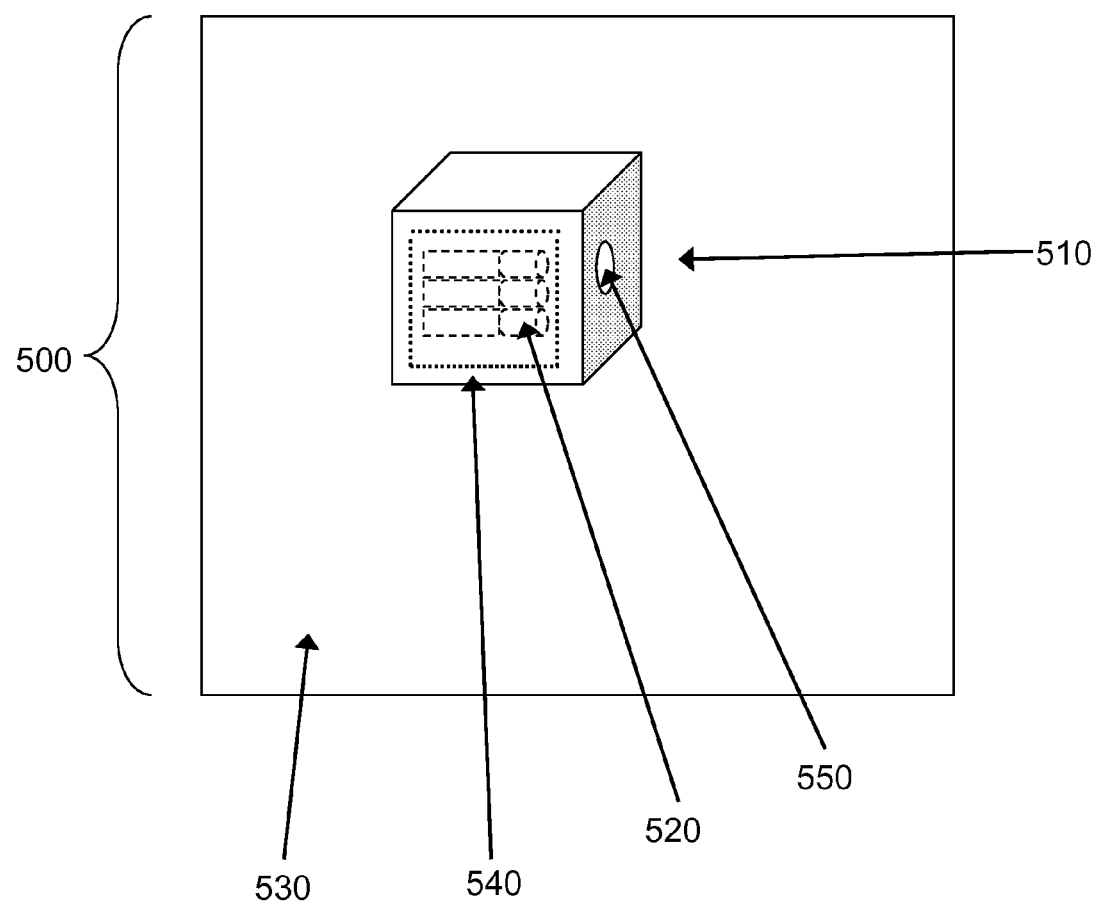
FIG. 5 shows a battery conserving solar electric refrigerator.

Solar Electric Refrigerator:

An embodiment provides solar electric powered refrigeration that does not rely heavily on a battery for night operation but optimizes direct use of sunshine-electric power. FIG. 5 shows refrigerator 500 that has freezing chamber 510 adjacent to or within refrigeration chamber 530. Chamber 510 contains material 520 having suitable heat capacity such as a volume of water or other fluid (preferably at least half the heat capacity of water) in closed container(s). Freezing chamber 510 is thermally isolated from larger refrigeration chamber 530 via thermal insulation 540. Thermal conduit 550 controllably allows heat from refrigeration chamber 530 to enter chamber 510 as needed to keep the refrigeration chamber cool.

In an embodiment, if chamber 510 becomes too warm, a thermostat activates a heat pump, such as a refrigeration compressor based unit, peltier device or other electronic circuit to cool down material 520. In an embodiment, a sensor and/or timer senses when solar radiation is sufficient for direct solar electric powering of the heat pump. When solar electricity is available, the solar power is used to pump heat from material 520 to the surrounding environment.

In a most convenient embodiment, material 520 comprises at least 50% water (preferably all water) and thermal conduit 550 is a small battery operable fan with adjacent shutters that automatically open when air is drawn or pushed through them. Refrigeration chamber 530 thus is cooled by air movement from refrigeration chamber 530 through chamber 510, which air contacts the surface of a bag or metal container that holds material 520, when needed as detected by a thermostat. In practice, material 520 is cooled far below the normal set temperature of refrigeration chamber 530 when the sun is shining, and thermal exchange between these occurs, particularly at night as needed. This alleviates use of battery power. In an embodiment, chamber 510 also makes ice cubes or doubles as a freezer.

Ambient Air Dryer (Humidity Air Conditioner):

An embodiment uses solar electricity to dehumidify air. One or more chemical water absorbents such as silica gel, clay, molecular sieve, CaSO4 or CaO are confined in a space and a fan is used to move humid air through the space and to an outlet, generating lower humidity air. When the absorbent becomes fairly saturated (e.g. over 50% saturated, preferably over 75% saturated with water) the air circulation (e.g. to a room) stops and solar electricity is used at least in part to heat the chemical absorbent, driving off water at a time of (preferably) maximum solar energy availability. This allows exploitation of solar electricity for air conditioning during early morning and late evening hours, when no or little solar electricity is available.

Figure 6:
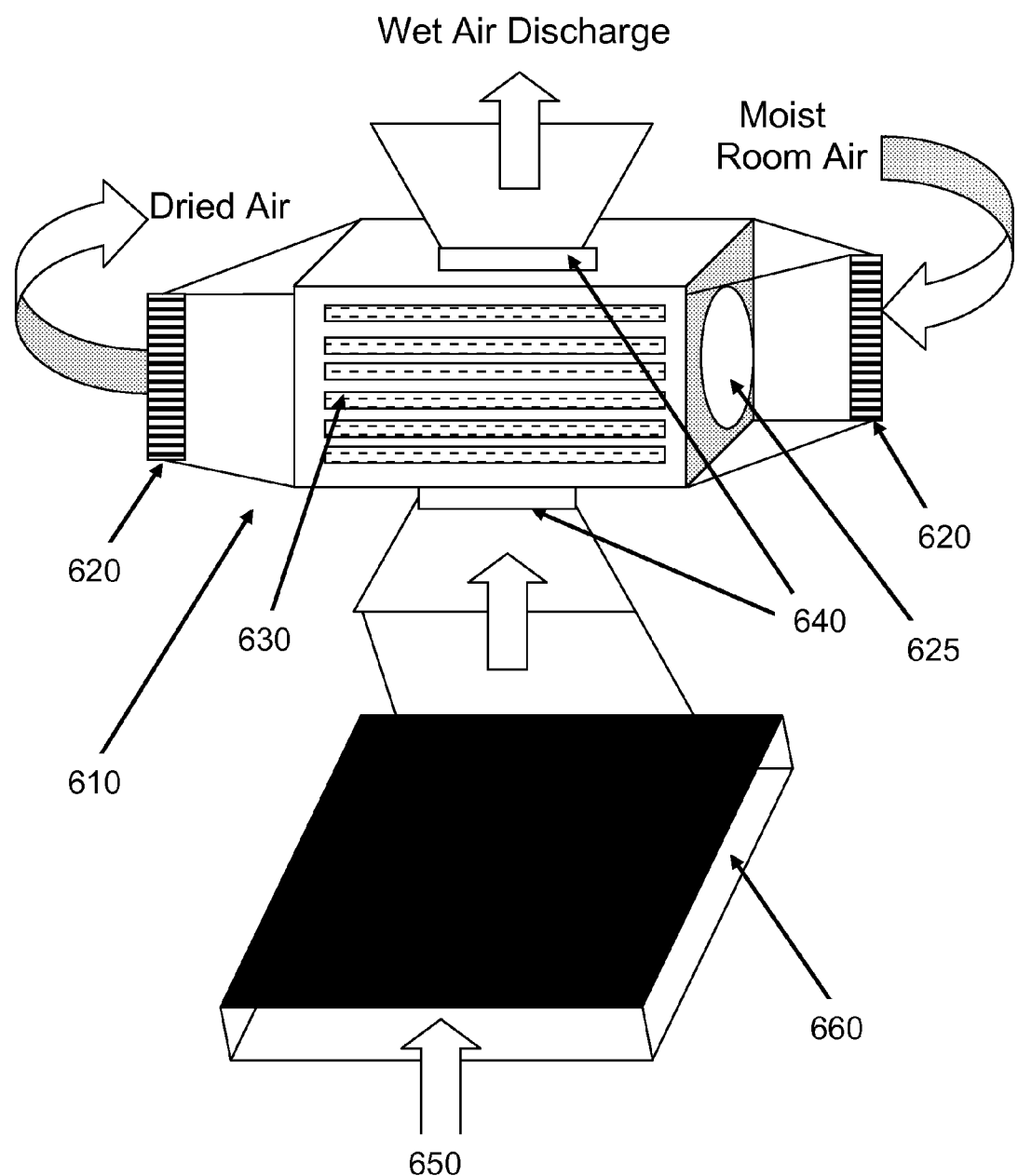
FIG. 6 shows a representative air dryer using desiccant.

FIG. 6 shows an embodiment wherein room air is circulated through box 610 with trays 630 of silica gel pellets (about 5 mm diameter) via fan 625. Shutter(s) 620 remain open during this (typically room) dehumidification. After pellets become suitably moist, shutter(s) 620 close and shutter(s) 640 open to an alternative air path. The alternative air path passes hot outside air 650 over the pellet surfaces. An electric heater in the box or in contact with the box is powered by solar electricity at a time of high solar irradiation to heat the pellets and further drive off water. The electric heater may comprise for example a resistance type heater, an infrared heater and/or a piezoelectric heat pump. One or more piezoelectric heat pumps are preferred wherein the hot side contacts directly or indirectly the desiccant and the cold side contacts directly or indirectly as a surface, the moist exhaust air, and participates in water collection.

Preferably this air dryer is combined with solar-passive heated air input from a conventional passive thermal heater so that incoming air is already fairly hot, for greater efficiency. A thin, preferably rooftop or awning mounted thermal heater 660 is shown in FIG. 6. In operation, preferably a moisture monitor is used to determine when the desiccant is ready for recharge and a thermostat is used to control temperature during discharge to a level that causes release of water from the desiccant but not too high to cause damage to components or result in lower efficiency. In an embodiment two desiccator boxes are provided and switched into the room air path as needed so that one can be used to dry air while the other is recharged.

Intelligent Prioritization of Solar Energy Use

Figure 7:
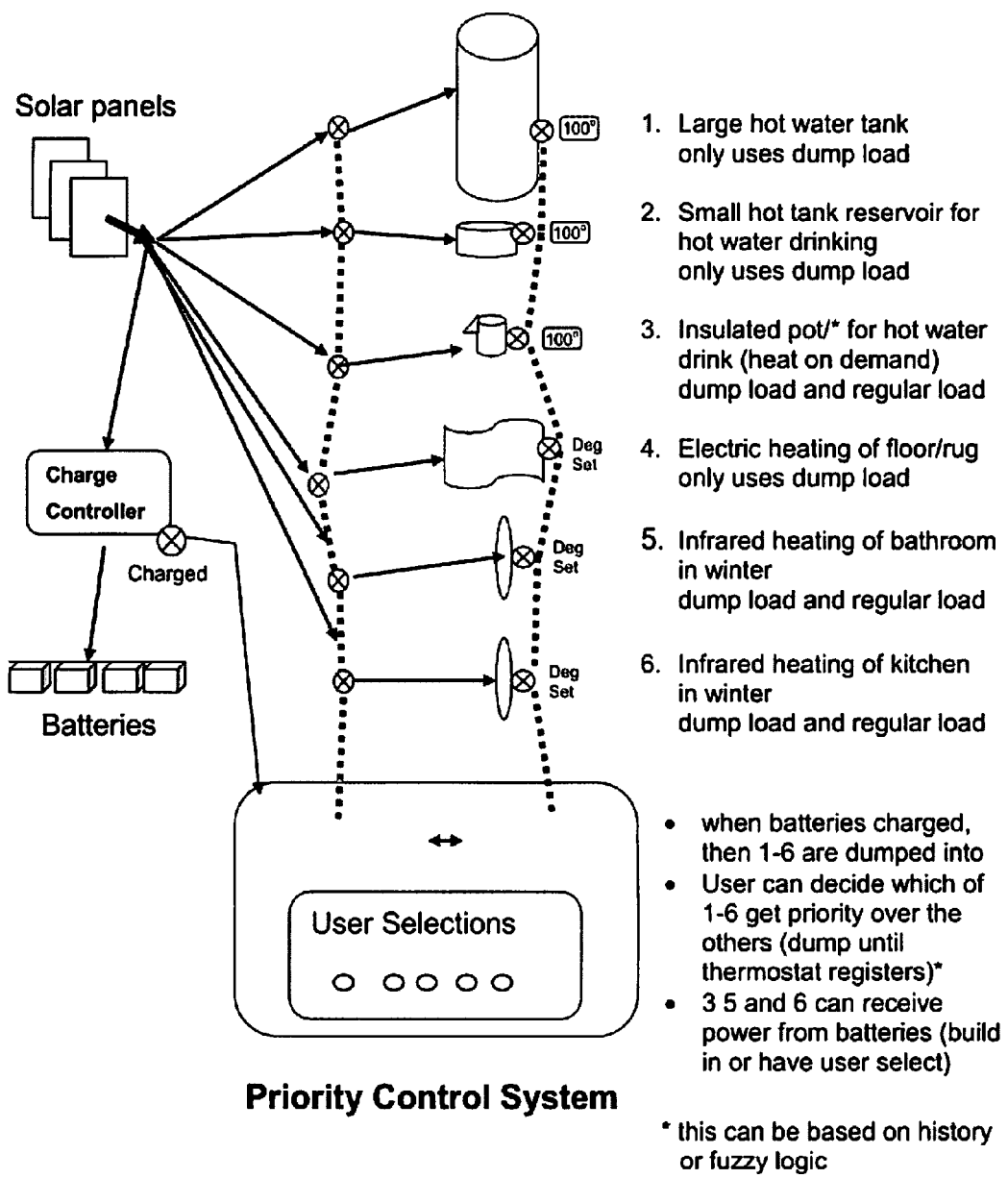
FIG. 7 shows a control scheme for prioritizing appliances.

In an embodiment a controller prioritizes appliances. The controller could be all or mostly hardware, but preferably includes at least one microprocessor and some software connected to temperature sensors and connected to power switches to switch and or modulate power to appliances as described above. FIG. 7 shows a representative group of appliances and how they might be connected in an embodiment. In an embodiment, two or more appliances are depicted as symbols (optionally including name-text) on a panel or other display and a user can select prioritization. For example a washer or dryer can be selected as a high priority if the user wants to wash clothes and there is not enough solar electricity to fully drive an air conditioner during activation of the washing machine. In this case, the user may select the washer as a higher priority (electricity would be cut to the air conditioner when the laundry machine turns on for example). In another embodiment, the controller monitors activation of appliances and automatically down-adjusts (or cuts) power to less discretionary appliances (such as water heaters and air conditioners) upon detection of a switch-on of a discretionary appliance that has been selected by the user.

Energy Prioritization by Voltage Control.

Preferably two or more controllers are connected in parallel between one or more groups of solar electric panels and two or more appliances that consume solar power. The controllers may be sold and installed as discrete units or built into a multiple unit console. FIG. 8 shows parallel converters 811, 812, and 813 between solar electric power source 805 and appliances 871, 872 and 873, respectively. Desirably another parallel controller 827 also can consume power output to charge batteries 830 as needed. In an embodiment, solar panel groups 851, 852 and 853 have different optimum output voltages and have separate controllers 854, 855 and 856 respectively, optimized for each respective voltage. Outputs from two or more may be combined in parallel to feed a common appliance 857.

A major issue is that each appliance has its own requirements and time-flexibility. For example basic hot water heating usually can be performed at a time very separate from the time of using the water. On the other hand, a heat pump usually is needed at more stringent times. If an air heat pump is called for based on a thermostat setting, this appliance should be activated at the time and thus is higher priority than a thermostat activation for heating of hot water. A turn-on of an electric dryer heating on the other hand would more likely be an intermediate priority.

In an embodiment, parallel control of discrete appliances or appliance circuits is carried out by setting the target voltage of the controller to a different level for a given solar electric source (such as a group of solar panels). See for example, FIG. 9. Here, solar panel group 805 has an optimum output voltage of 54.0 volts. It is important to remember that under light load or no load the actual voltage output from 805 will be significantly higher than 54.0 volts. This embodiment uses monitoring and control of solar panel output group 805's actual voltage to prioritize distribution to appliances.

For example, a first controller 811 connected as a load on 805 has a target voltage of 54.0 volts. This so-called "target voltage" is the voltage above which the controller (typically a PWM driven MOSFET) turns on more often to pulse-drive highest priority appliance 871. Second controller 812 connected in parallel on 805 has a target voltage of 54.5 volts. The output of controller 812 drives second highest priority appliance 872. A third controller 813 connected in parallel on 805 has a target voltage of 55.0 volts. The output of controller 813 drives third highest priority appliance 873. Simply by setting the target voltage for a controller, prioritization of power usage can be carried out automatically by hardware and preferably by setting threshold voltage in a PWM circuit to turn off power to a load when solar supply voltage drops below a determined value. Such setting can be done once, during manufacture, by user selection, or by automated selection according to an algorithm that accounts for needs of various appliances.

Figure 9:
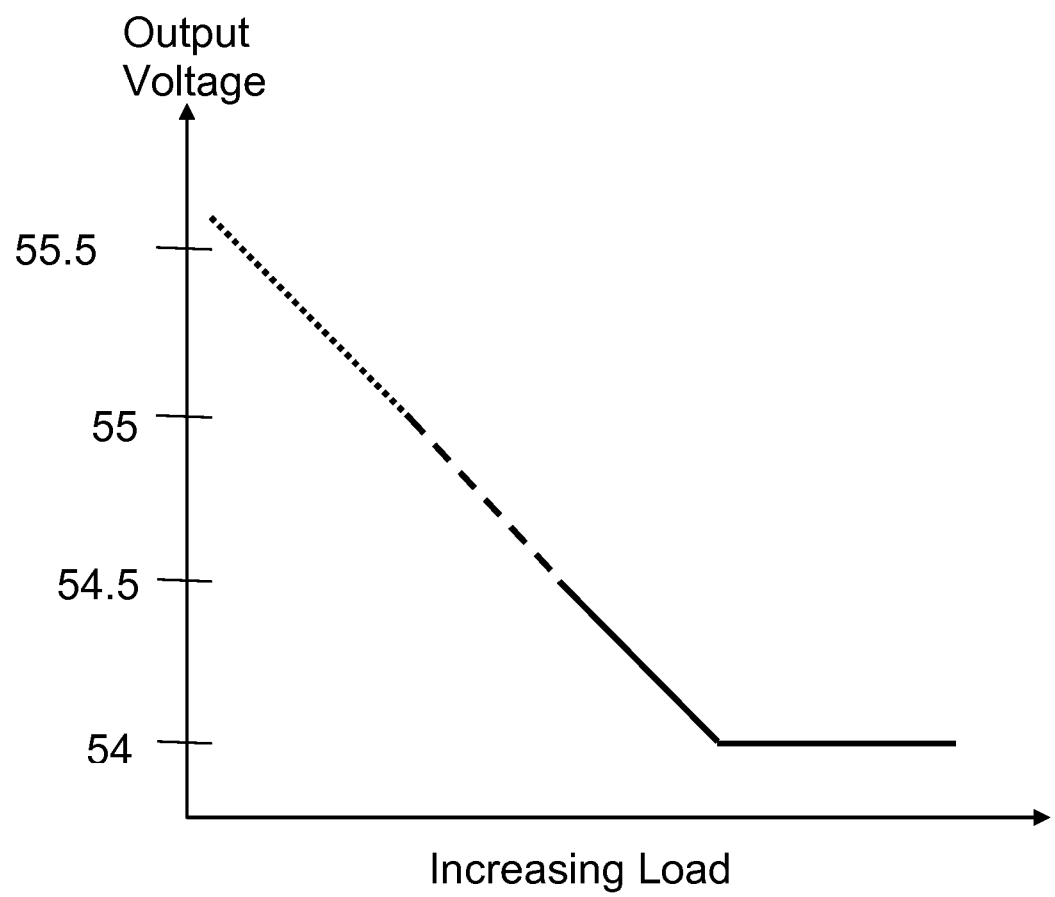
FIG. 9 graphically shows decreased solar output voltage with increasing loads, with different regions available to different prioritized appliances (or users).

See FIG. 9, which shows how with increasing load (X-axis) on the solar electricity source the voltage at the output of the solar panel drops towards the maximum output voltage. As appliances draw power from 805, the voltage shown in FIG. 9 decreases. In the example of FIG. 8, if appliance 873 turns on, controller 813 experiences a load from 873 and pulls out current from 805, thereby dropping the output voltage of 805 until appliance 873 is satisfied or until the voltage drops to 55 volts. The dotted line (left portion) indicates the solar panel output range wherein appliance 873 can draw power. For example, if appliance 873 only needs 2 amps of the 805 output then only two amps will be drawn. If 805 is capable of putting out 15 amps (due to high sunlight condition) then simply turning on appliance 873 will not use up the available power from 805 and the voltage output from 805 will drop (move to the right in FIG. 10 graph) but will remain above the maximum power output voltage (preferably at or about 54 volts in this example).

Now, another parallel connected controller that has a target set point that is at or below the actual voltage output from 805 will additionally take power from 805 until the actual voltage output drops to that set point. In this example, controller 812 will draw power IF appliance 872 is switched on and only to the extent as 805 output remains above the set point of 54.5 volts. And, controller 811 will draw power IF highest priority appliance 871 is switched on and only to the extent as 805 output remains above the set point of 54.0 volts. As seen on the graph, the dotted line and the dashed line together show the output voltage ranges when appliance 872 can receive power. All dotted, dashed and unbroken lines together show the output voltage ranges when appliance 871 can receive power.

In this example, highest priority goes to controller 811, which will draw power IF appliance 871 is switched on and only to the extent as 805 output voltage remains above the set point of 54.0 volts. During operation, voltage set points may be adjusted with changes in priority of the appliances to optimize the value of available solar electric power.

If the solar output is low (low lighting conditions) then only a small amount of power is available and a small draw of power from an appliance will quickly drop the solar electric output 805 to a lower voltage. For example, during low lighting conditions, the output of 805 will easily drop with a load to below 54.5 volts, so that only appliance 871 will receive power, since the voltage will drop to 54 volts. As sunlight increases, the voltage output of 805 will increase and as the voltage exceeds 54.5 volts, power will start flowing to appliance 872. Preferably, during sunlight operation, the output of 805 will not drop below its optimum output power (54 volts in this example) because all controllers are set to reduce or stop taking power when the voltage is below 54 volts.

Figure 3:
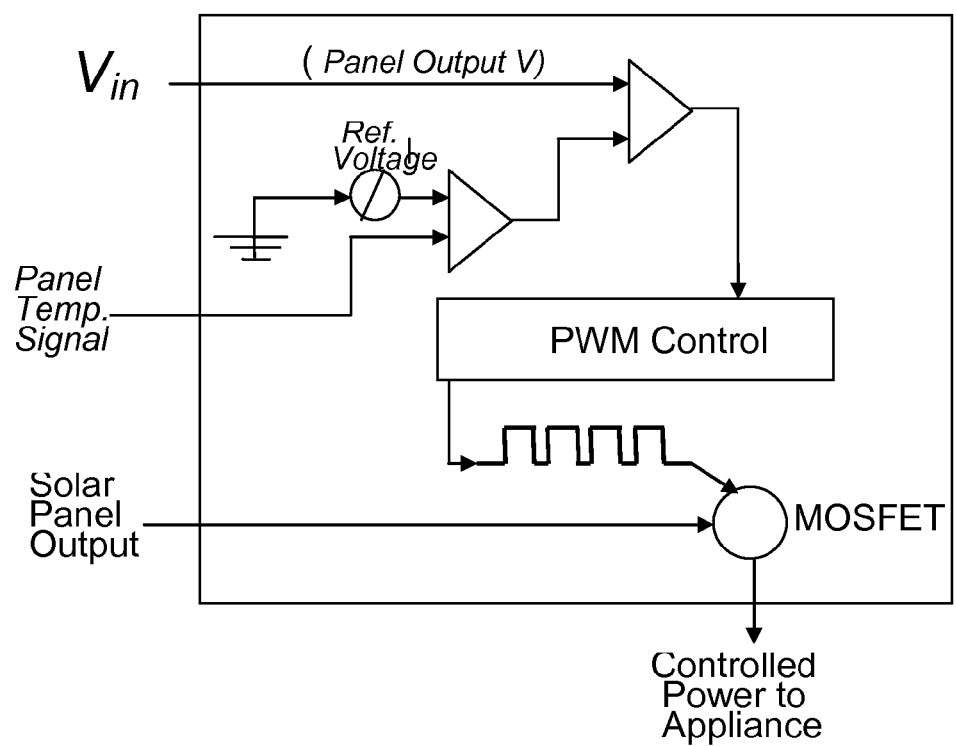
FIG. 3 shows controller 2 details for a desirable embodiment.

In a preferred embodiment controller 2 of FIG. 3 is used to sense Vin from the solar panel(s) and a MOSFET is controlled to draw power only if Vin remains above the stated set point of 54, 54.5, 55 etc.

In other embodiments not shown in detail, further combinations of the above are made. For example, two or more groups of solar panels may be fed into one controller handling one appliance and two or more controllers may feed a common appliance. Control of power to the appliance, in the latter case, may be effected by error feedback control signal proportional to the current or voltage, or power actually used by the appliance.

Farm/Garden Appliances

Embodiments provide electric powered agriculture tools that preferably are solar electric powered. In an embodiment the agriculture tool is primarily activated during high sunlight conditions and has a motor that goes slower or turns off in response to low sunlight.

Rototiller.

Electric rototillers were constructed that provided surprising good tilling and good steering. Two electric tilling motors with gears/tines attached are coupled together side by side in a common horizontal axis. By activating each one separately electronic steering was achieved. In an embodiment two power levels are available to each of the two motors and switched as needed to steer. It was found that turning off one motor, with the other motor on failed to steer well. Instead when steering left, for example the left motor section is powered down about 50% (preferably between 30% to 75% power) and to steer right the right motor section is powered down instead.

One problem is that the rototiller bumps and changes direction easily. To alleviate this problem one or more obstacle monitors are used to momentarily decrease power to one side or the other of the two-motor unit to compensate. In an embodiment, current draw from each motor is sensed and the two sides balanced. When one motor has a high current draw (from encountering a large stone for example) the current draw on the other side is modified momentarily to compensate and help keep the rototiller on a straight path. In another embodiment an electronic compass senses the earth's magnetic field and used to set a straight course. If the rototiller deviates from a constant sensed direction, power is adjusted to one side or the other to compensate. For example, if the rototiller path is exactly due north, and the sensor indicates an attitude bearing change towards the west then this sensed deviation activates a controlled decrease in power to the right side motor.

Figure 10:
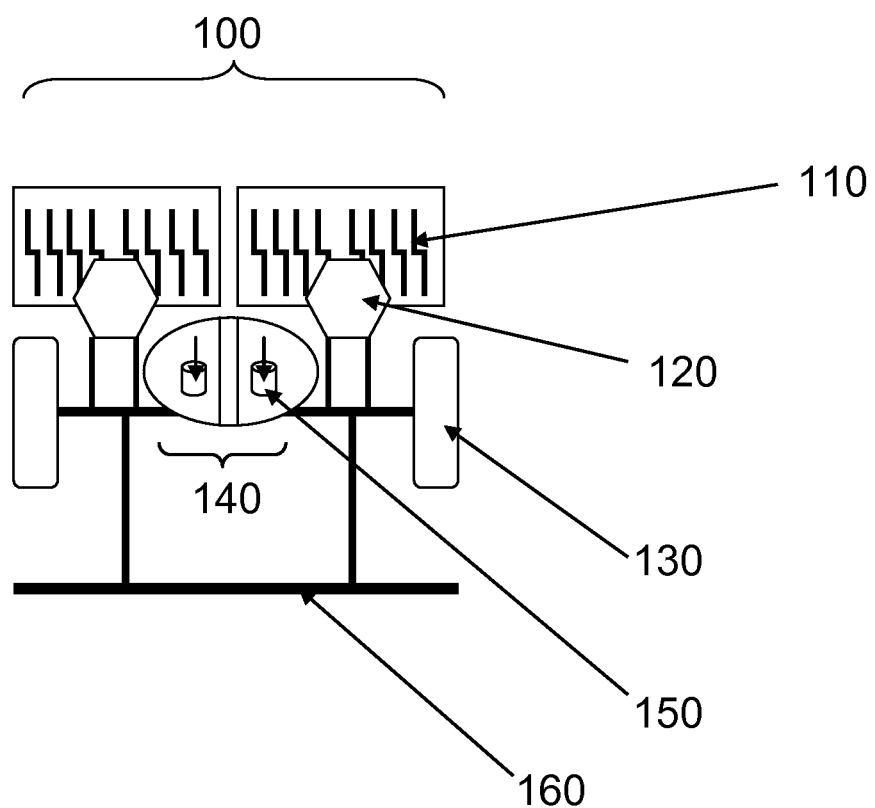
FIG. 10 shows an electric rototiller.

A practical working example was made by connecting two 1000 watt Sun Joe tiller units together side by side and separately controlled as shown in FIG. 10. Electric tiller 100 has two sets of tines 110, each set connected a motor 120. The tiller has two wheels 130 and an electrical controller 140. It was surprisingly found that good steering could be obtained by decreasing power by about 20% to 80% and preferably from 35% to 60% (but not turning off) to one motor or the other as needed. A left turn was conveniently obtained by decreasing power to the left motor, for example.

In an embodiment the controller has two sensors, (preferably ultrasonic such as 20 kHz, 30 Khz, or higher) which together sense the direction of a guiding ultrasonic signal. As shown in FIG. 10, the controller may comprise a barrier between the two sensors so that ultrasonic wave energy (shown as arrows that enter each sensor separately in the figure) can be sampled in a stereoscopic fashion. A stronger reception signal from the right side sensor, for example, can indicate that the tiller is pointed to the left of center and needs to turn right to remain on a straight course. I simple balancing circuit may be used to determine this or the determination can be done in software. In response, power to the right motor can be decreased or terminated a short time to effect a heading change towards the right. In an embodiment, each row to be tilled has an ultrasonic transmitter positioned above the center row line with the sensor output facing straight down the row. Separate transmitters can be used on separate rows and may be turned on in sequence, employ different combinations of frequency, modulations or pulse repetitions to allow different sensing for each row.

In a preferred embodiment one or more transmitters are located on the rototiller (or other self-moving agricultural machine). When facing forward, the one or two (preferably laser or LED but ultrasonic emitter may be used) transmitters are oriented away and in the direction of forward movement. A reflector is located at the end of the row and reflected energy (light or ultrasonic) from the reflector(s) is used to differentially steer the self-moving machine. For example an ultrasonic transmitter located in the self moving machine center axis and at least 12 inches (more preferably at least 20 inches, and yet more preferably at least 25 inches above the ground) faces forward and sensors are located on both lateral sides of the transmitter. Reflected energy is sensed and used for steering. One or more sensors located lower on the machine may be used simultaneously for obstacle avoidance. Transmitter(s) and sensors may also be located on the opposite side and used for travel in the opposite direction, in an embodiment.

Sensing of the row end may occur via sensing more than one ultrasonic transmitter and detection used to execute a turn sequence. In an embodiment the tiller has multiple (e.g. two) facing forward and also facing backwards, to allow coordinated use for automated steering.

Another embodiment minimizes rough bumping/rotation motions that twist the tiller to the left and right. It was found that when hard ground or a rock was encountered the side of the tiller encountering the hard spot tends to jump up and cause departure from a straight path. This may be minimized by a fast time response monitoring of stereoscopic ultrasonic. In a desirable embodiment this is done by monitoring voltage (preferably) or current or both to each motor and detecting a surge in power to indicate an obstacle. In response to the detection, the motor on that detected obstacle side may be momentarily decreased in power or interrupted, soon after the detection. This can compensate for faster forward motion but the reverse also may be used to detect slower movement due to the obstacle.

In another embodiment, an electronic compass is used to help maintain the tiller on a constant heading. The compass output signal indicates heading. The signal may be monitored for departure from a fixed (inputted or simply remembered (in software or hardware) value or electrical indication. When an unintended departure from the heading is detected, power may be decreased or interrupted to the motor on the side towards which the departure has been made.

In yet another embodiment wheel movement is monitored to detect departure from a straight forward path (differential wheel movement) or to detect unoptimum digging depth. In an embodiment wheel motion is determined by infra red sensing of wheel movement. The sensor may be a "move" or "no move" sensor or can sense rate of movement (i.e. rotation).

Control of tilling depth is important. After extensive experimentation, it was surprisingly found that a drag bar (item 160 in FIG. 10) works better than a single drag point and should be located behind the wheel axis. When moving the apparatus to a field or garden, the drag bar is positioned up, or positioned to lightly drag on the ground A small wheel in the middle or multiple wheels can help this. When the apparatus becomes positioned onto ground to be tilled, then the drag bar is fixed below the wheels such that the wheels are positioned at least part way, and preferably completely off the ground. This may be done manually or by automatic motion. Preferably a tiller depth controller such as a horizontal bar is movably positioned behind the wheels in a manner such that adjusting the bar down leaves the bar at a lower position than the wheels and makes the tines dig more into the ground.

It was found that replacing the drag bar with two vertical bars/tines provided greater performance. Heavy steel pipes held vertically for rototilling a depth and that rotate around a horizontal axis parallel to the wheel axis were used, and large springs were used to hold the lower part of the tines in a vertical position into the ground deep enough (preferably between 1 and 3 inches below the wheels) to hold the wheels off the ground. Preferably the springs are attached above the pivot point at the top of the rotating bar. It was found that independently mounting these tines with their own springs for independent movement gave much smoother performance during rototilling. In an embodiment, the rotating bar-tines were horizontally connected by a flat steel bar to keep them at a constant spaced relationship with respect to each other. However, the flat thin bar allowed the round pipe-tines to individually give (with spring loading) when the tines hit a rock. When moving the machine without tilling, the tines are rotated up and out of the way (lower end that contacts the ground rotates back towards the operator and upper end above the pivot point rotates forward) so that the wheels can be used. The springs are disconnected from the tops and the lower pipe ends that dig into the earth rotate backwards and a chain was used to hold them up, in a preferred embodiment.

Cultivator.

An embodiment provides tillage by electronically controlling two motors having tines attached as shown in FIG. 10 but with space (for a plant) between the two sets of tines. The rotating tines are vertically spaced at least 6 inches and preferably at least 12 inches below the motors such that a tall plant (6 inches or 12 inches respectively) can pass between the two sets of tines while cultivating weeds on either side of the center. In this case preferably each motor with attached tines can be adjusted (spaced) horizontally away from each other to leave an un-tilled center region between them. The other control aspects reviewed above are also intended for the cultivator embodiment as well. In this case however the drag bar preferably is replaced with an individual tine on each side that is positioned low enough to at least partially hold the wheels off the ground. In an embodiment for both tiller and cultivator, such individual tine is controlled vertically by a motor, which responds to wheel movement so that forward motion and even steering is controlled by vertical placement of the respective drag tines located on the left and right of the centerline.

Electric Power Distribution into a Garden or Farm.

Figure 11:
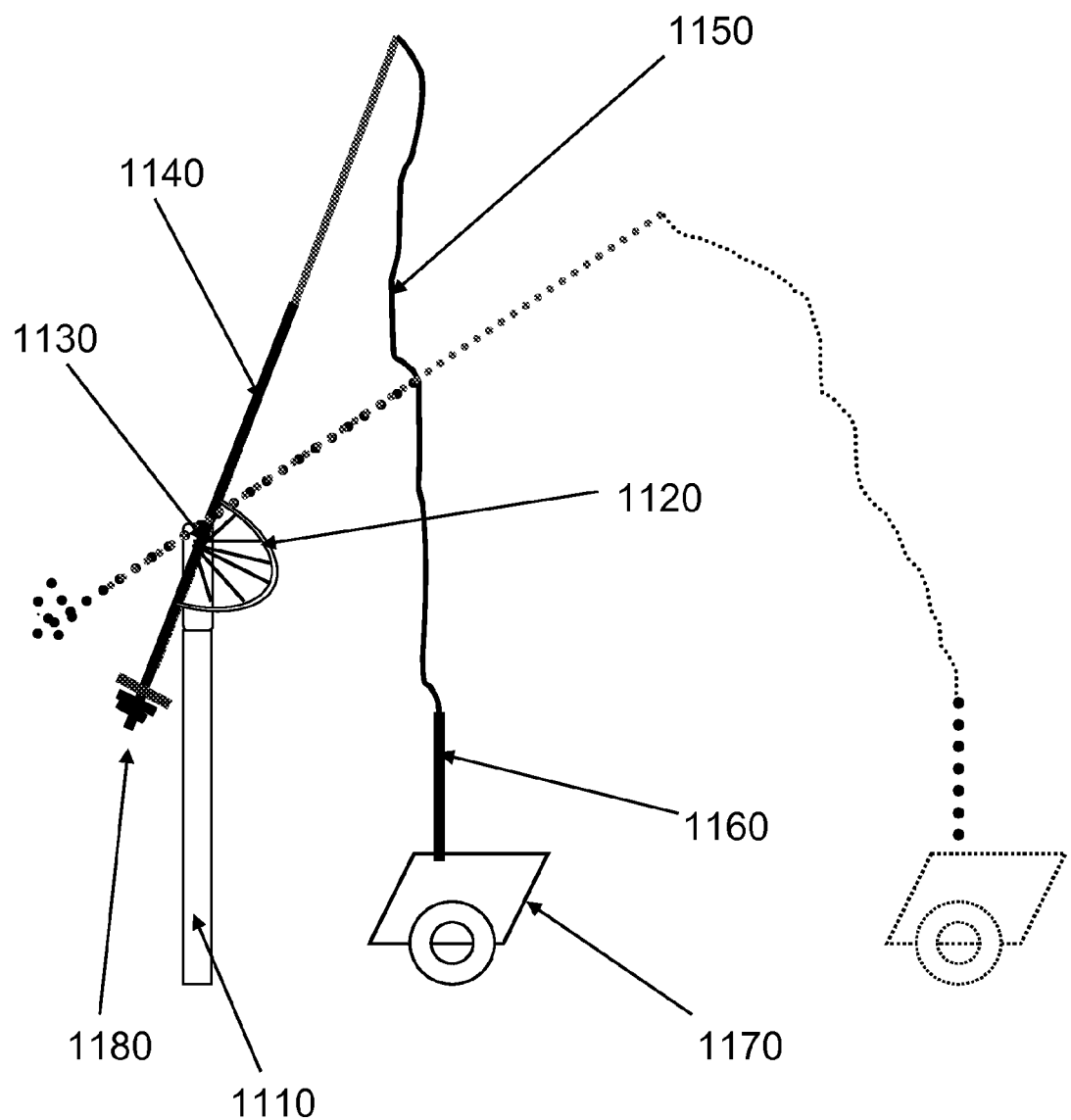
FIG. 11 shows an electricity supply pole that provides aerial power via a long wire that easily moves in X, Y and Z directions.

In this embodiment, an x, y, z movable pole is mounted on a post and used to distribute electricity into a field. FIG. 11 shows pole 1110 with half wheel holder 1120 attached at the top. Holder 1120 can rotate and also holds rotating wheel or wheel axle 1130, which can rock up and down, and has attached wire holder 1140 from which dangles power wire 1150. Power wire plugs into electric incoming power post 1160 of an apparatus such as an electric tiller 1170. This equipment was constructed using an old bicycle front end (forks, steering mechanism) shown as 1180 in this figure. The front wheel was cut in half, and a metal tube attached.

A counter balance weight 1180 is used that is heavy enough to offset the weight of wire holder 1140 and wire 1150 plus extra weight to provide a slight lifting force to the end of wire 1150 (preferably less than 5 lbs, more preferably less than 1 pound and more preferably less than 0.5 lb as measured at the end of the wire that engages with the intended equipment). This allows the wire to remain off the ground at all times. Preferably wire 1150 has a length that is about (within 25% more preferably within 10%) the distance of wire holder 1140 (from the post center to the end where the free wire 1150 starts) plus the height of post 1110. This allows the wire to feed connected equipment located next to the pole as well as almost vertically away from the pole. FIG. 11 shows in dotted lines, a representative movement of the wire as the wire follows attached equipment.

Horizontal Moving Equipment Pole that Rotates to Minimize Wire on Ground

Figure 12:
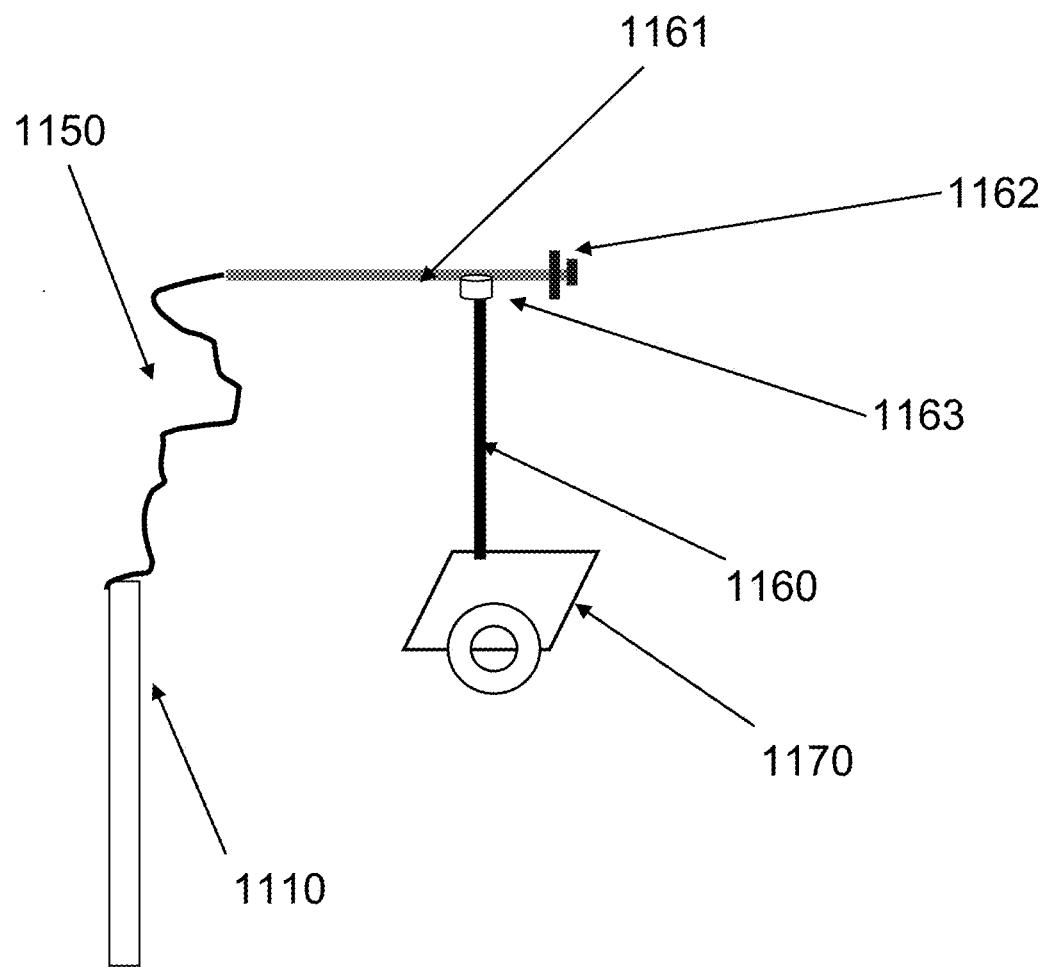
FIG. 12 shows an agriculture moving equipment with a rotating horizontal feed pole 2 meters up to minimize wire entanglement.

In an embodiment, a rotating wire is attached via a horizontal pole 1161 to the top of a vertical pole 1160 of moving equipment 1170 as shown in FIG. 12. The horizontal pole 1161 preferably has a counterweight 1162 at one shorter end and is electrically connected to allow rotation, via a swivel connector 1163. Connector 1163 preferably is a Mercotac™ Model 230. Power wire 1150 may be connected to an extension cord on the ground, or for example connected to a power line on post 1110 as shown. Post 1110, if used, preferably contains a wire feed mechanism that retractably feeds out wire as needed when equipment 1170 moves away and also tugs on line 1150 and retracts when the line becomes slack.

Auto-Retract Power Line Feeder Mounted at a High Position

In a more inexpensive embodiment a wire feed mechanism that preferably contains a spring facilitated auto-retract mechanism is mounted on a post or otherwise at a high location, preferably at least 6 feet (wire exit position) up and more preferably at least 7 feet or even at least 8 up above the ground. A power wire thus is supplied to the moving equipment and the moving equipment preferably lacks a horizontal pole but only has a vertical pole with power wire at the top thereof. Preferably the vertical pole on the moving equipment has a power line attached at least 6 feet above the ground, more preferably at least 7 feet above the ground and yet more preferably at least 8 feet above the ground. This embodiment was studied in a few prototypes and it was discovered that extending a good section of power line from the end of the horizontal pole at least 7 feet high off the ground on the moving equipment works best. For example, an 8 foot pole on the moving equipment should have at least 4 feet wire extending, more preferably at least 6 feet extending and in an embodiment just enough extending so that the drooping wire cannot touch ground, but can be held up by tension with the feed line from an auto-retract mechanism such as the "Mantis Cord Management Kit for Electric Tiller available from Mantis. By leaving a good section drooping, a longer tether distance from the fixed feed point could be realized.

The embodiments and other examples described herein are representative only. A skilled artisan readily will comprehend further embodiments and embellishments based on the teaching herein. All such embodiments and embellishments are intended and are intended to be within the scope of the claims.

The invention claimed is:

1. A solar electric distribution system, comprising:
one or more solar panels that provide a solar panel supplied voltage having an optimum voltage output, an energy storage unit charger and a variable appliance loader that provides pulsing direct current power to an appliance from the solar panel supplied voltage based on priority level of the appliance, connected in parallel, wherein the variable appliance loader provides pulsing direct current power to the appliance at a lower solar panel supplied voltage when the appliance is higher priority and provides pulsing direct current power to the appliance at a higher solar panel supplied voltage when the appliance is lower priority.

2. The solar electric distribution system of claim 1, wherein the variable appliance loader uses pulse width modulation and increases pulse width with increased detected voltage above a selected output target voltage.

3. The solar electric distribution system of claim 1, wherein, a maximum of one blocking diode and one other power semiconductor device is necessarily electrically connected in series between the solar panel output and the appliance to achieve regulated voltage.

4. The solar electric distribution system of claim 1, wherein the power provided to the appliance is direct current provided to at least one of: a heating element, a DC motor, a high power ultraviolet light used for disinfection, an infrared light used for heating or drying, a grow light, and an electrochemical reaction for splitting of water.

5. The solar electric distribution system of claim 1, wherein the variable appliance loader applies solar electricity to two or more loads that are prioritized.

6. The solar electric distribution system of claim 5, wherein the two or more loads are selected from the group consisting of a refrigeration compressor, a heat pump compressor, a water pump, a fan, lights, a dryer heater, a dryer motor, a water tank heater, an infrared heater, a floor heater, and a resistance air heater.

7. The solar electric distribution system of claim 1, wherein the appliance priority is set by user selection.

8. The solar electric distribution system of claim 5, wherein each appliance priority is set by user selection.

9. The solar electric energy system of claim 1, wherein the higher solar panel supplied voltage is above the optimum voltage output of the one or more solar panels.

10. A solar electric energy system having a maximum power output voltage that prioritizes supply of solar electric energy to appliances, comprising:
a source of solar energy having an output voltage that can vary with load;
multiple appliances that consume energy from the source of solar energy; and
one or more controllers connected between the source of solar energy and the multiple appliances;
wherein the one or more controllers provide pulsed DC power to and adjust the solar energy output load voltage to alternative regulated target voltages based on priority of attached appliances, such that
a high priority appliance but not low priority appliance is powered at a low adjusted solar energy output load voltage and a low priority appliance is powered at a higher adjusted solar energy output load voltage.

11. The solar electric energy system of claim 10, wherein the solar energy output load voltage is set by user selection.

12. The solar electric energy system of claim 10, wherein the one or more controllers controls one appliance.

13. The solar electric energy system of claim 12, wherein the one or more controllers controls the output load voltage by adjusting duty cycle of a PWM circuit.

14. The solar electric energy system of claim 10, wherein a maximum of one blocking diode and one other power semiconductor device is necessarily electrically connected in series between the solar panel output and each appliance to achieve voltage regulation.

15. The solar electric energy system of claim 10, wherein the solar energy output load voltage is set by automated selection according to an algorithm that accounts for needs of the multiple appliances.

16. The solar electric energy system of claim 10, further comprising a battery charge controller connected in parallel with the one or more controllers of the multiple appliances.

17. The appliance prioritization system of claim 10, wherein the adjusted solar energy output load voltage is above the maximum power output voltage for the common solar electric power supply.

* * * * *